April 27, 1965     O. WELTER     3,181,020
ALTERNATING-CURRENT MACHINE
Filed Sept. 6, 1960
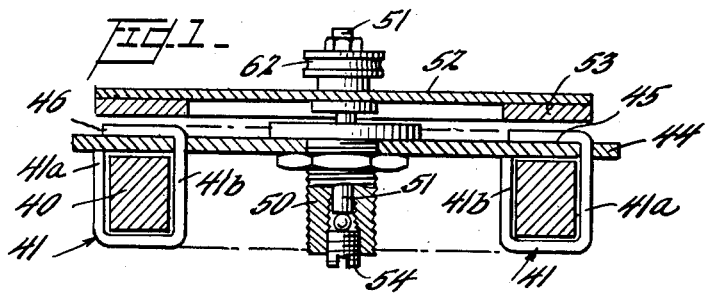
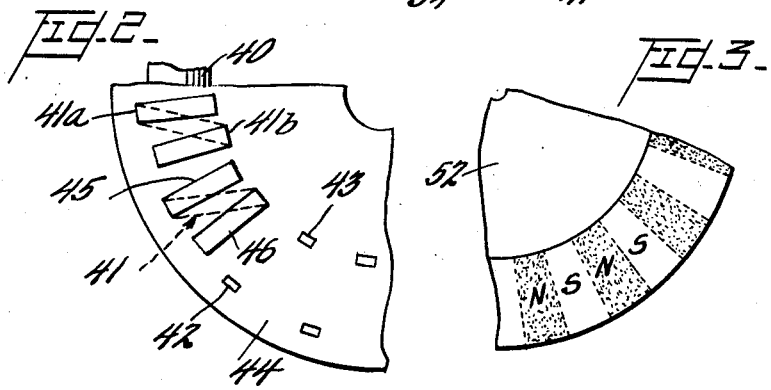
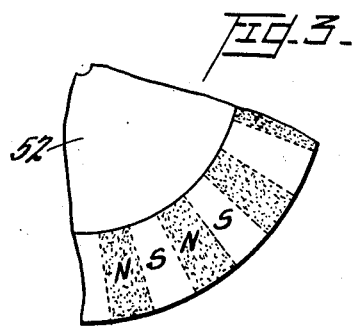
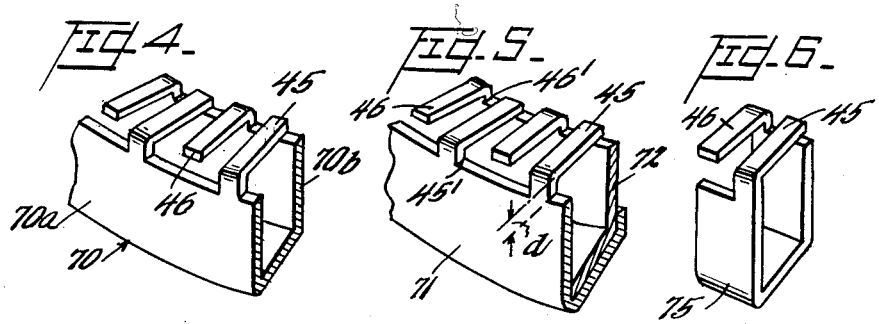
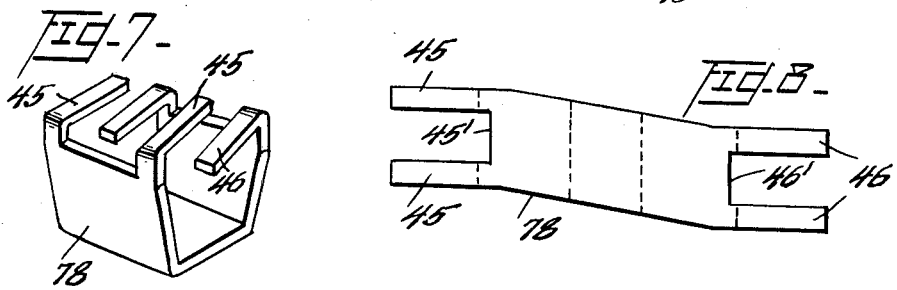
INVENTOR
Otto Welter,
BY
Watson, Cole, Grindle + Watson
ATTORNEYS

United States Patent Office 3,181,020
Patented Apr. 27, 1965

3,181,020
ALTERNATING-CURRENT MACHINE
Otto Welter, Orselina, Ticino, Switzerland, assignor to Elektro-Motoren A.G., Zug, Switzerland
Filed Sept. 6, 1960, Ser. No. 54,200
Claims priority, application Austria, Sept. 7, 1959, A 6,499/59
3 Claims. (Cl. 310—164)

This invention relates to an alternating-current machine with a stator and at least one rotor which is separated from the stator by an air gap running radially to the rotor axis. It is known to have such A.-C. machines designed with at least one annular field coil which is arranged in the stator concentrically with the rotor axle and located in an annular hollow space of which at least the boundaries arranged coaxially to each other are formed by at least one magnetically conducting part and include at least one row of spaced pole-pieces extending in the peripheral direction of the machine.

The present invention has for its object to improve such an A.-C. machine, and the invention consists principally in that, seen in cross-section of the annular field coil, the magnetically conducting boundary of the annular hollow space (for brevity hereinafter called annulus) which is interrupted by at least one slot, preferably in the peripheral direction of the machine, consists at most of two counterparts preferably similar to each other in mirror image, and that the tooth-like polepieces, starting from the outer and the inner boundaries of the annulus, extend radially inwards and outwards respectively in known manner, and that the roots of the teeth of these polepieces lie within the outer and/or inner surface of the boundary of the annulus. Now because the magnetically conducting boundary of the annulus consists of at most two parts, there results a lower magnetic resistance, whereby the losses in ampere turns can be kept low. The arrangement according to the invention of the tooth-like polepieces or of the roots of their teeth ensures the best possible field system, whereby the efficiency will be appreciably improved. In addition, the arrangement according to the invention is constructionally extremely simple, inasmuch as the coil box may be stamped in a simple manner out of sheet-iron and bent. Moreover, if the magnetically conducting boundary of the annulus is interrupted by at least one slot circumferentially of the machine, eddy currents can be avoided.

The arrangement of parts for the coil box, that are in mirror image or at least similar to each other, offers the advantage that for the manufacture of these parts each time the same stamping automatic or similar stamping tools may be adopted.

In accordance with a preferred form of embodiment of the invention, the distance apart of the roots of the teeth of the polepieces from the inner edge of the bent polepieces corresponds at least to the thickness of the sheet-metal of the polepieces, thus providing a particularly favorable field system. Then an adequately strong insulating disk may be inserted between the field coil and the bent polepieces. Finally, the bending of the polepieces at a distance from the roots of the teeth can be more easily carried out.

According to the invention, the arrangement can be so provided that the outer and inner magnetically conducting boundaries are formed by a single workpiece surrounding the field coil in its cross-section. Thus the lowest possible magnetic resistance will result, and the operation, otherwise necessary for connecting two or several parts of the coil box, is avoided. In the sense of the invention it is possible, however, to proceed also in such a way that the outer and inner magnetically conducting boundaries consist of separate workpieces which, along their portion turned away from the polepieces, are in magnetically conductive connection with each other.

In order to avoid large sheet-metal pieces, of which the coil box has to be made, according to the invention the inner and outer boundaries can each be composed of several magnetically conducting parts arranged beside each other in the peripheral direction of the machine; an outer and an inner of these parts, one each, being formed by the leg of a stirrup surrounding the field coil in its cross-section. In this way, many similar relatively small stamped parts will result, which may easily be produced from the waste of other punching operations.

Other objects and features of novelty will be apparent from the following specification when read in connection with the accompanying drawings in which some forms of embodiment are diagrammatically illustrated by way of example.

In said annexed drawings:

FIG. 1 shows in axial section a first form of embodiment of a single-phase machine;

FIG. 2 represents a fragmentary top view of a part of the stator alone;

FIG. 3 is a fragmentary view of a part of the rotor alone, as seen from below in FIG. 1;

FIGS. 4–7 show each in perspective view a modified form of stator iron parts; and FIG. 8 represents a stamped part for making the stator iron part according to FIG. 7.

Referring more particularly to FIGS. 1–3, the stator of the machine shown has a single annular field coil 40 whose windings run in the peripheral direction of the machine. The coil 40 is located in an annular hollow space (or annulus) which is partly defined by magnetically conducting stator iron parts 41, each of which surrounds the field coil 40 in its cross-section and has the form of a stirrup made of a substantially U-shaped bent flat strip. The two U-legs 41a and 41b of each stator iron part 41 are stuck through suitable apertures 42 and 43 in a circular carrier disk 44 of magnetically non-conductive material, say insulating material. The end portions of the legs 41a, 41b projecting at the other side of said disk 44 are bent over to lie thereon and form a ring of polepieces 45, 46. The end portions 45 of the outer legs 41a are bent somewhat radially inwards, and the end portions 46 of the inner legs 41b somewhat radially outwards. Thereby the polepieces 45, 46 extend in the same radial plane and alternately interengage each other.

The central portion of the carrier disk 44 has fixed therein a bearing 50 in which an axle 51 of the rotor is rotatably supported. The bearing 50 may be of any known construction and therefore need not be described here in detail.

The rotor has a disk 52 arranged parallel to said carrier disk 44 and secured on the axle 51, the disk 52 carrying at its peripheral portion a circular ring-shaped permanent-magnetic armature 53 which is opposite the ring of polepieces 45, 46 while leaving a radial air gap. By means of a set screw 54 inserted in said bearing 50, the width of the air gap can be altered. The armature 53 is magnetized in such a way that it has in the peripheral direction and alternately succeeding each other, zones of opposite magnetic polarity, that is to say north poles N and south poles S alternating with each other as shown in FIG. 3. The magnetic zones N and S preferably agree in number with that of the polepieces 45 and 46. Advantageously, as material for the manufacture of the armature 53, Ferroxdur (branded product) or the like is used.

The axle 51 has fixed thereto a cord roller 62 (FIG. 1), it being understood that instead of it a pinion or some other member may be provided equally well, as adapted to enable driving connection between the axle 51 of the motor and another machine.

The described single-phase A.C. machine may be used selectively as a generator or as a synchronous motor (so-called impulse field motor). The action of such machines is known per se and need not be explained here.

While in the described form of embodiment according to FIG. 1, the stator iron consists of a plurality of single stirrups 41, the stator iron according to FIG. 4 may also be made of a single piece of material which is a ring 70 of substantially U-shaped cross-section. Again inserted into the interior of said ring 70 is a field winding (not shown in FIG. 4) so that also the ring 70 surrounds the field winding in the cross-section. The alternating polepieces 45, 46 are formed by teeth which are arranged respectively outside and inside of the two coaxial boundaries 70a, 70b of the space containing the winding. Again, the teeth are stuck through apertures 42, 43 in the carrier plate 44 (not shown for clarity) and then offset to lie on said plate. Preferably, the stator iron ring 70 is not entirely closed circumferentially so that it does not form a short-circuit winding which would be magnetically coupled to the field coil of the stator.

In the modification according to FIG. 5, the stator iron ring in cross-section is made up of two parts 71 and 72, one of which forms the outer, and the other the inner, of the coaxial boundaries of the space accommodating the field coil. Each of the parts 71 and 72 is provided with a row of teeth which, for the purpose of forming the polepieces 45 and 46, are bent over into the same radial plane. At their portion turned away from the teeth or polepieces 45 and 46, the two parts 71 and 72 are offset so as to overlap each other, thus forming a magnetically conductive connection therebetween.

FIG. 6 illustrates a single stator iron element 75 which, similarly as in the first form according to FIGS. 1 and 2, is substantially an U-shaped stirrup having, however, a greater width than a single polepiece 45 or 46. A plurality of such stator iron elements 75 are disposed beside each other in the peripheral direction of the machine so as to form in their entirety a ring similar to that according to FIG. 4.

A modified form of a single stator element 78 is shown in FIG. 7. Said element 78 again is a substantially U-shaped stirrup having at each of its legs two teeth for forming polepieces 45 and 46 which alternately interengage each other. Also in this case several of the stator elements 78 are arranged beside each other in the peripheral direction of the machine, in order to form a stator iron ring similar to that according to FIG. 4. FIG. 8 shows further, as developed, the stator iron element according to FIG. 7. In this shape, the element is stamped out and subsequently bent along the bending lines indicated by broken lines.

As apparent from FIGS. 1–8, the polepieces 45, 46 are not offset at their roots proper, but only at a distance therefrom. This distance $d$ is indicated in FIG. 5 and amounts, as measured from the roots of the teeth 45', 46' of the polepieces up to the inner edge of the bent over polepieces 45, 46, to at least the sheet-metal thickness of the polepieces.

What I claim is:

1. Electric alternating-current machine comprising a stator, at least one rotor separated from said stator by an air gap extending radially to the rotor axis, at least one field coil arranged concentrically to the stator axis, said coil being located in a hollow space defined by four boundaries three of which are composed of parts forming an annular channel-like structure with its opening facing the rotor, at least those boundaries disposed concentrically to each other being formed each by at least one magnetically conductive part; at least one row of spaced pole pieces arranged alternatively from the inner and outer of said magnetically conductive parts and bent to lie radially in one plane perpendicular to the stator axis and defining the fourth boundary of the annular hollow space, and an apertured carrier disc with the polepieces projecting through the apertures in the carrier disk and which latter is of magnetically non-conductive material and provided radially to the rotor axis, said polepieces being offset to lie on said disk, and said carrier disk including means adapted to support the rotor axle.

2. Electric alternating-current machine comprising a stator, at least one rotor separated from said stator by an axial air gap extending at right angle to the rotor axis, said stator having at least one field coil arranged concentrically to the stator axis, said coil being located in a hollow space defined by four boundaries three of which are composed of parts forming an annular channel-like structure with its opening facing the rotor, at least those boundaries disposed concentrically to each other being formed each by at least one magnetically conductive part; at least one row of spaced pole pieces arranged from the inner and outer of said magnetically conductive parts and bent to lie radially in one plane perpendicular to the stator axis and defining the fourth boundary of the annular hollow space, said magnetically conductive parts being interrupted, along the circumference of the machine, by at least one gap and the outer and inner magnetically conductive boundaries being constituted by a single part surrounding the field coil in its cross-section.

3. Machine according to claim 2, wherein the distance from that side of the bent over pole pieces facing the field coil to the roots of said pole pieces correspond to at least the thickness of the material utilized forming the magnetically conductive parts and the pole pieces.

References Cited by the Examiner
UNITED STATES PATENTS

| | | | |
|---|---|---|---|
| 1,967,782 | 7/34 | Putnan | 310—162 X |
| 1,977,185 | 10/34 | Haydon | 310—162 |
| 2,323,035 | 7/43 | Hansen et al. | 310—254 |
| 2,412,461 | 12/46 | MacIntyre | 310—164 |
| 2,432,573 | 12/47 | Jorgensen | 310—164 |
| 2,541,830 | 2/51 | Phaneuf | 310—164 |
| 2,823,324 | 2/58 | Davis | 310—164 X |

MILTON O. HIRSHFIELD, *Primary Examiner.*